United States Patent [19]
Obermeyer

[11] Patent Number: 5,948,501
[45] Date of Patent: Sep. 7, 1999

[54] COMPOSITE TO METAL STRUCTURAL CONNECTION

[76] Inventor: Henry K. Obermeyer, 303 W. County Rd. 74, Wellington, Colo. 80549

[21] Appl. No.: 09/008,048

[22] Filed: Jan. 16, 1998

Related U.S. Application Data

[63] Continuation-in-part of application No. 08/518,620, Aug. 23, 1995, Pat. No. 5,709,502.
[51] Int. Cl.⁶ .................................. B32B 3/06; B32B 1/06
[52] U.S. Cl. ............................. 428/98; 156/293; 428/120
[58] Field of Search ............................. 156/293; 428/98, 428/120; 403/265, 267

[56] References Cited

U.S. PATENT DOCUMENTS 5,422,150  6/1995  Scoular et al. ........................... 428/157

Primary Examiner—Alexander Thomas
Attorney, Agent, or Firm—Dean P. Edmundson

[57] ABSTRACT

Metal to composite connections are described wherein multiple ply composite elements with preformed fanned marginal edges are inserted into dovetail grooves and secured by injection of solidifiable resin into the wedge shaped voids between reinforcement plys.

2 Claims, 6 Drawing Sheets

COMPOSITE TO METAL STRUCTURAL CONNECTION

CROSS-REFERENCE TO RELATED APPLICATION

This application is a continuation-in-part of my application Ser. No. 08/518,620, filed Aug. 23, 1995, Pat. No. 5,709,502.

FIELD OF THE INVENTION

This system generally relates to systems for connecting reinforced composite structural elements to metallic or isotropic structural elements or to other composite structural elements.

BACKGROUND OF THE INVENTION

Structural connections for composite structures commonly use heavy thickened sections with hole patterns or embedded connection elements for attachment to metal structural elements. Conventional wedge or dovetail connections require an open ended and straight dovetail slot or a slot with a removable closure element to permit assembly. Such conventional configurations are limited as to geometry and add extra weight to the completed assembly. For aerospace structures the weight of conventional connections is problematic.

SUMMARY OF THE PRESENT INVENTION

In accordance with the present invention there is provided a multiple ply reinforced sheet with a connecting edge. Said edge is configured with tapered voids between successive layers of reinforcement. The combined void and reinforcement arrangement at said edge forms a wedge shaped edge with a total included angle of 90 degrees for example. The individual reinforcement plys may be held in proper position by a small amount of cured resin or binder. Said proper position may be established during lay-up and curing of said composite structural element. The flexibility of the unbonded individual plies permits bending of the individual plies and compression of the sheet edge to allow insertion of the sheet edge into a dovetail groove.

A further advantage of this connection system is that a tight fit and uniform load distribution is attained without relying on tight manufacturing tolerances or joint preloads which would reduce allowable useful loads.

A further advantage of this connection system is that the cost, weight and reliability problems associated with discrete fasteners such as rivets or bolts are avoided.

A further advantage of this connection system is that friction and chemical bonding to the metal structure is neither required nor need be relied on.

DETAILED DESCRIPTION OF THE INVENTION

Connections which include the unique connection system of this invention are composed of at least one multi-layer composite element inserted into a second element which may be isotropic such as metal or may be an anisotropic structure such as an epoxy matrix carbon fiber composite.

Figure 1:
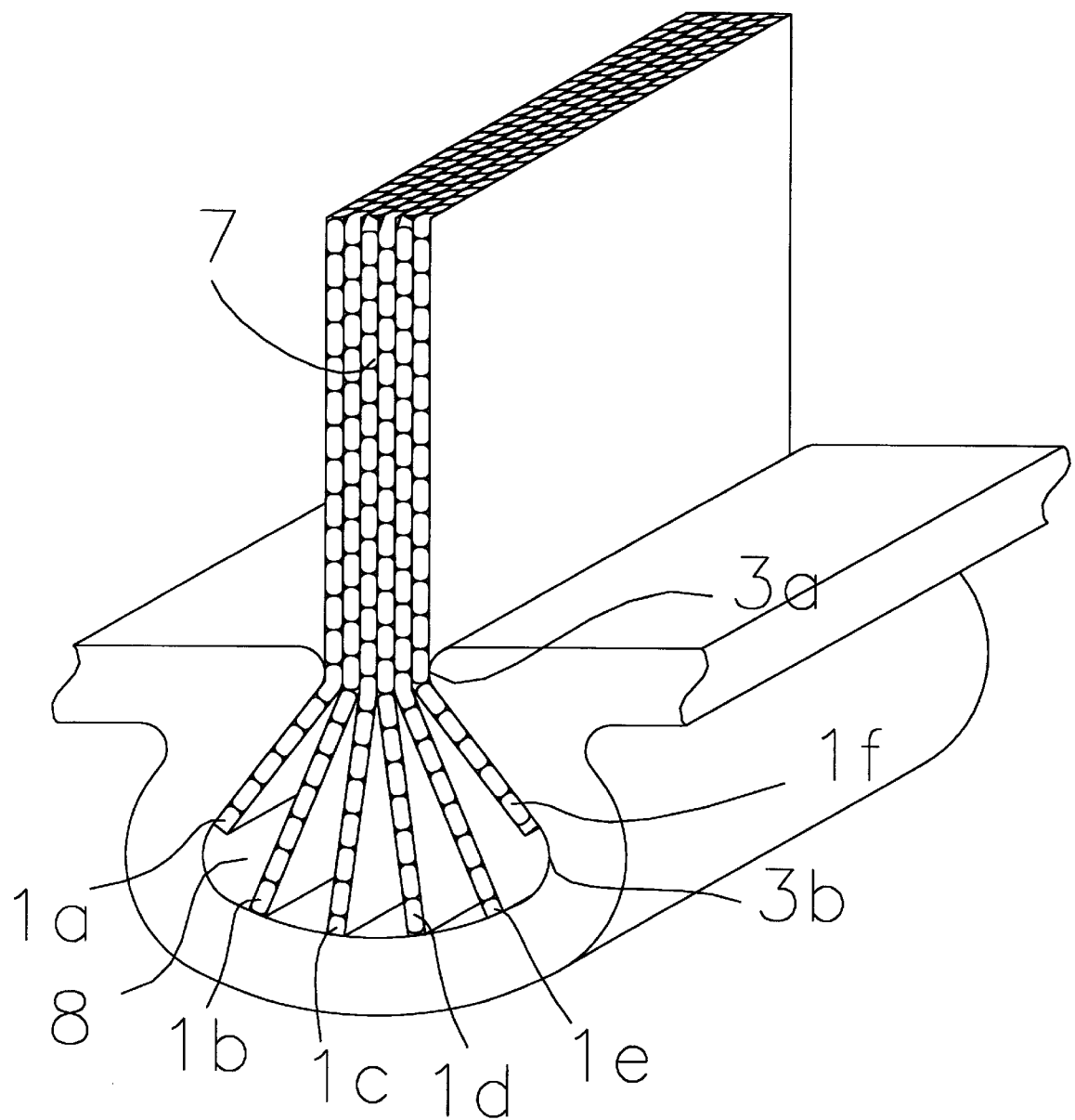

An embodiment of the present invention is shown in FIG. 1. Referring to FIG. 1, the composite inserted element 7 extends through an opening 3a into a cavity or dove tail slot 3b. Individual reinforced layers 8 are held in position by solidified resin which fills cavities 4a, 4b, 4c, 4d, and 4e. This configuration robustly attaches composite element 7 to slotted element 3 while providing high structural efficiency and load sharing among the composite layers 8.

Figure 2:
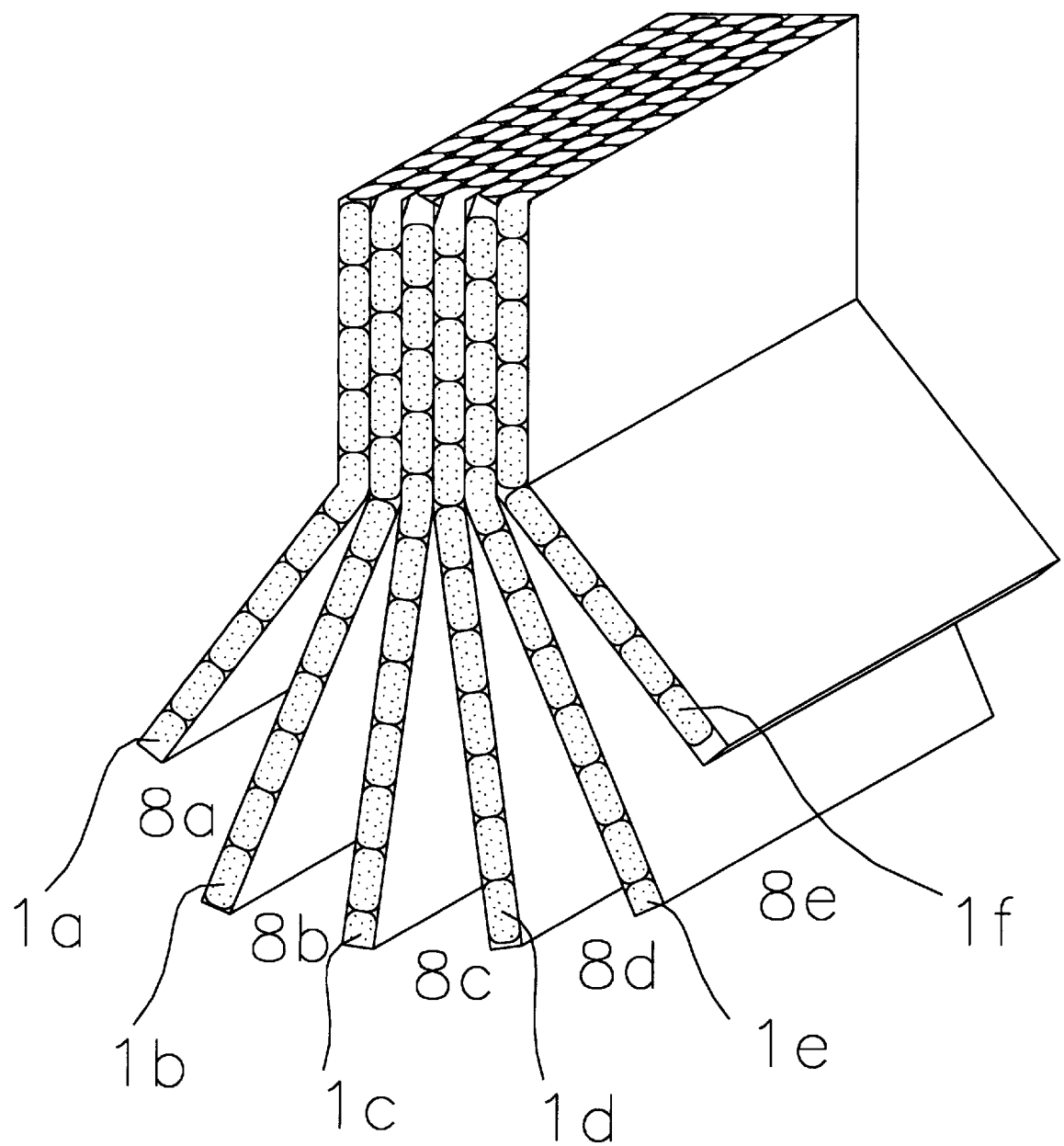

Referring to FIG. 2, the inserted element 7 is preferably preformed to provide wedge shaped spaces between reinforced layers 8a, 8b, 8c, 8d, 8e and 8f. Alternatively, small fillable tubes could be prepositioned between the reinforced layers to cause spreading upon filling with resin.

Figure 3:
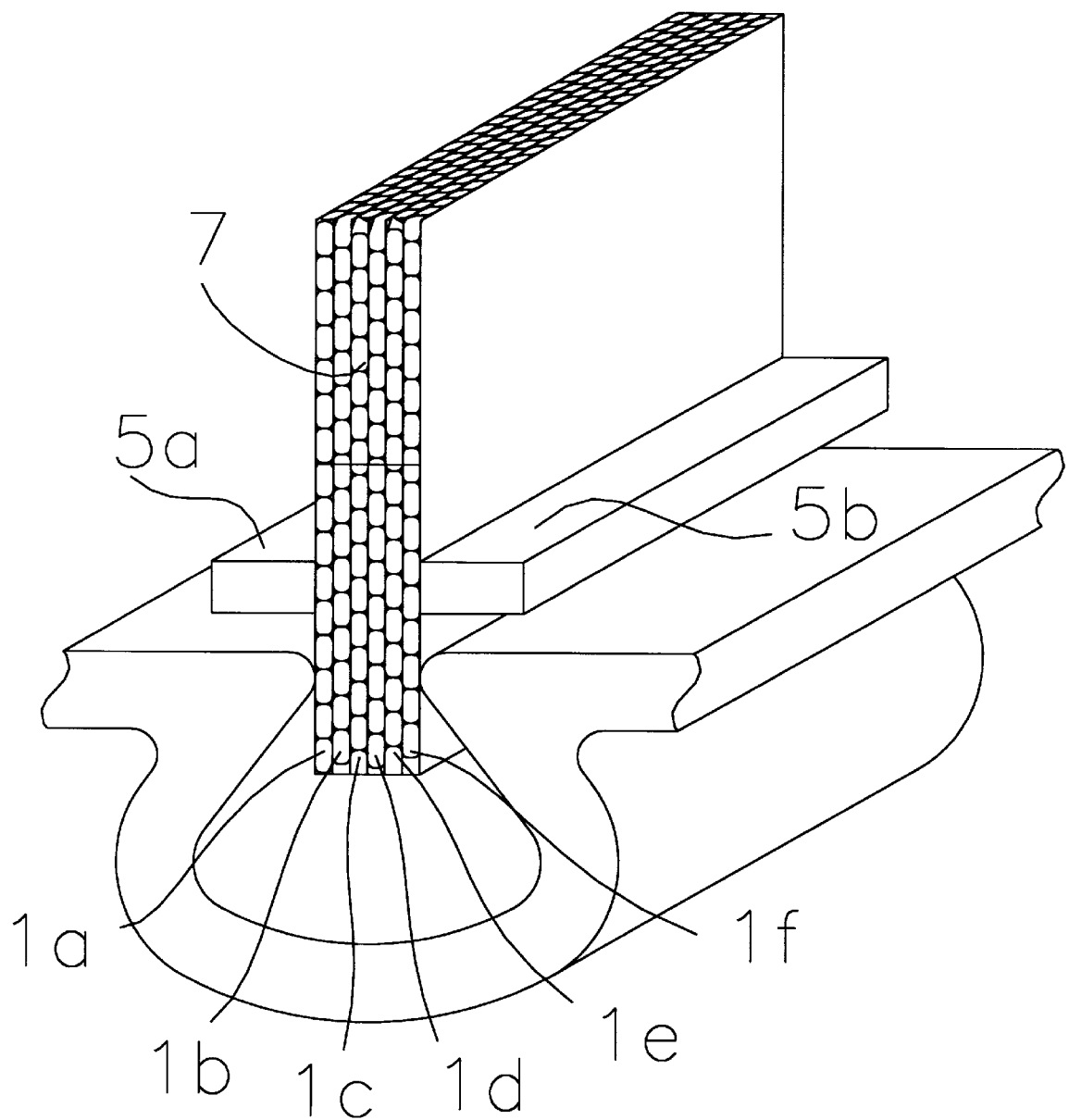

Referring to FIG. 3, a clamping means 5a and 5b may be used to assemble said inserted element into slot 3a. During insertion reinforced layers 1a, 1b, 1c, 1d, 1e and 1f are compressed together. Said reinforced layers spring back into proper relationship after assembly.

Figure 4:
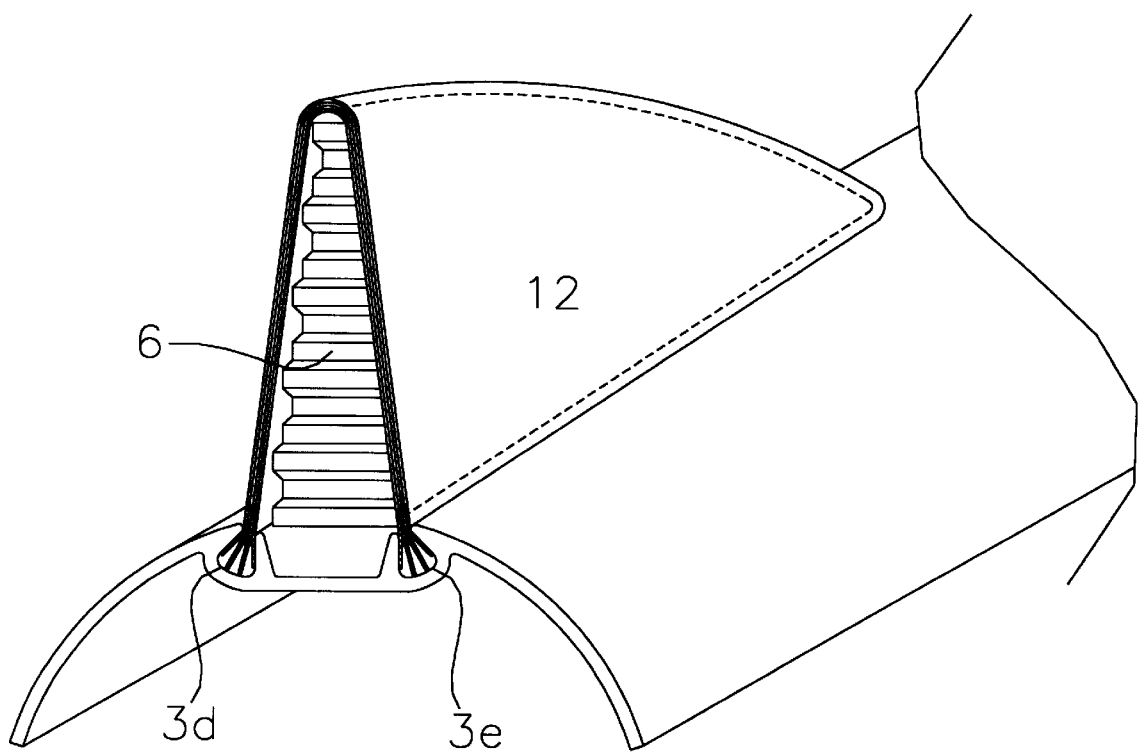

Referring to FIG. 4, a honeycomb core structural element such as an aerodynamic stabilizer 12 may be attached be means of parallel slots 3d and 3e. Said slots may be have inner sides parallel to each other and outer sides beveled in order to facilitate compression of the fanned out reinforced layers from the outside of the structure.

Figure 5:
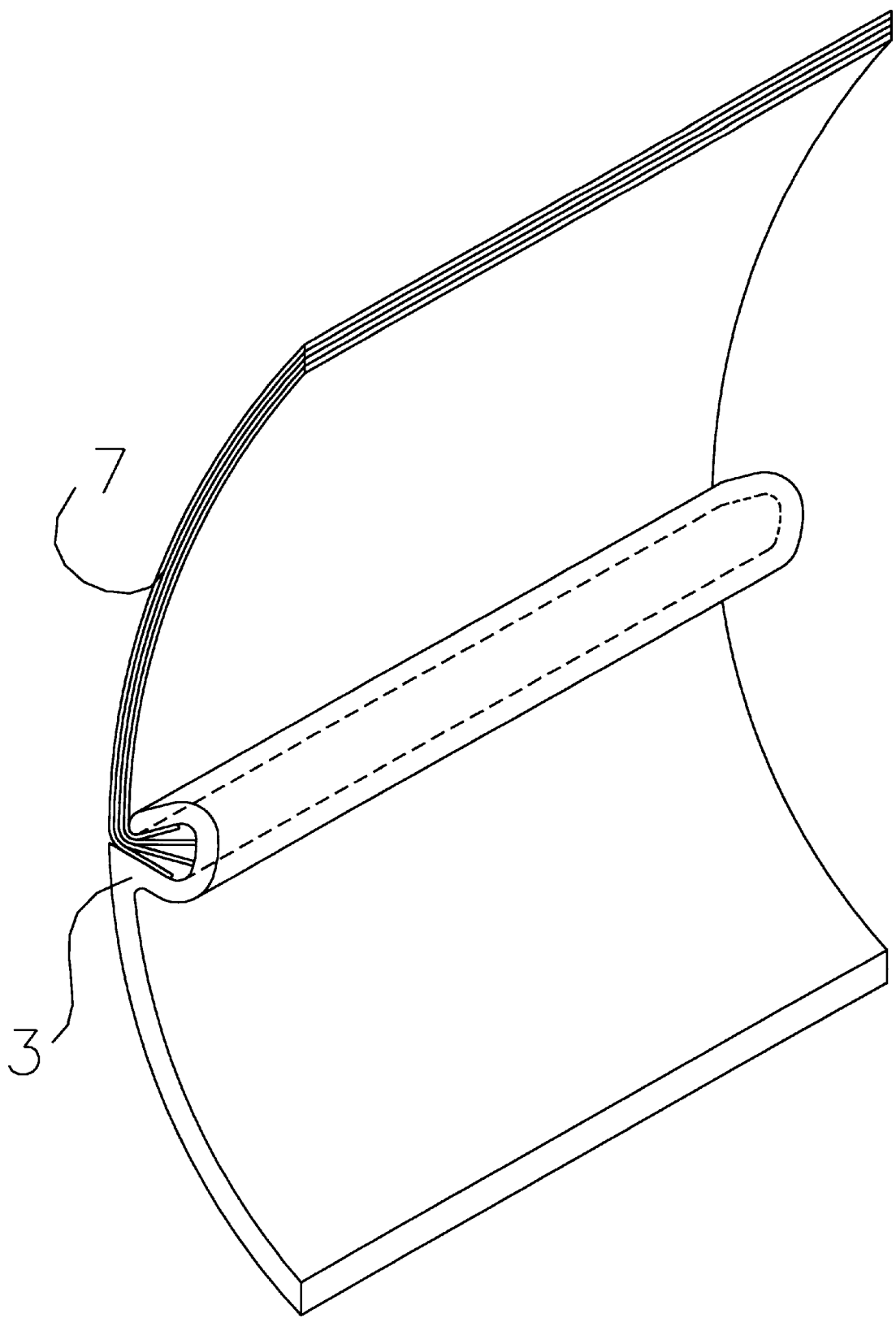

Referring to FIG. 5, the inserted element 7 may be oriented parallel to the slotted element 3 in such a way as to create an aerodynamically desirable flush surface.

Figure 6:
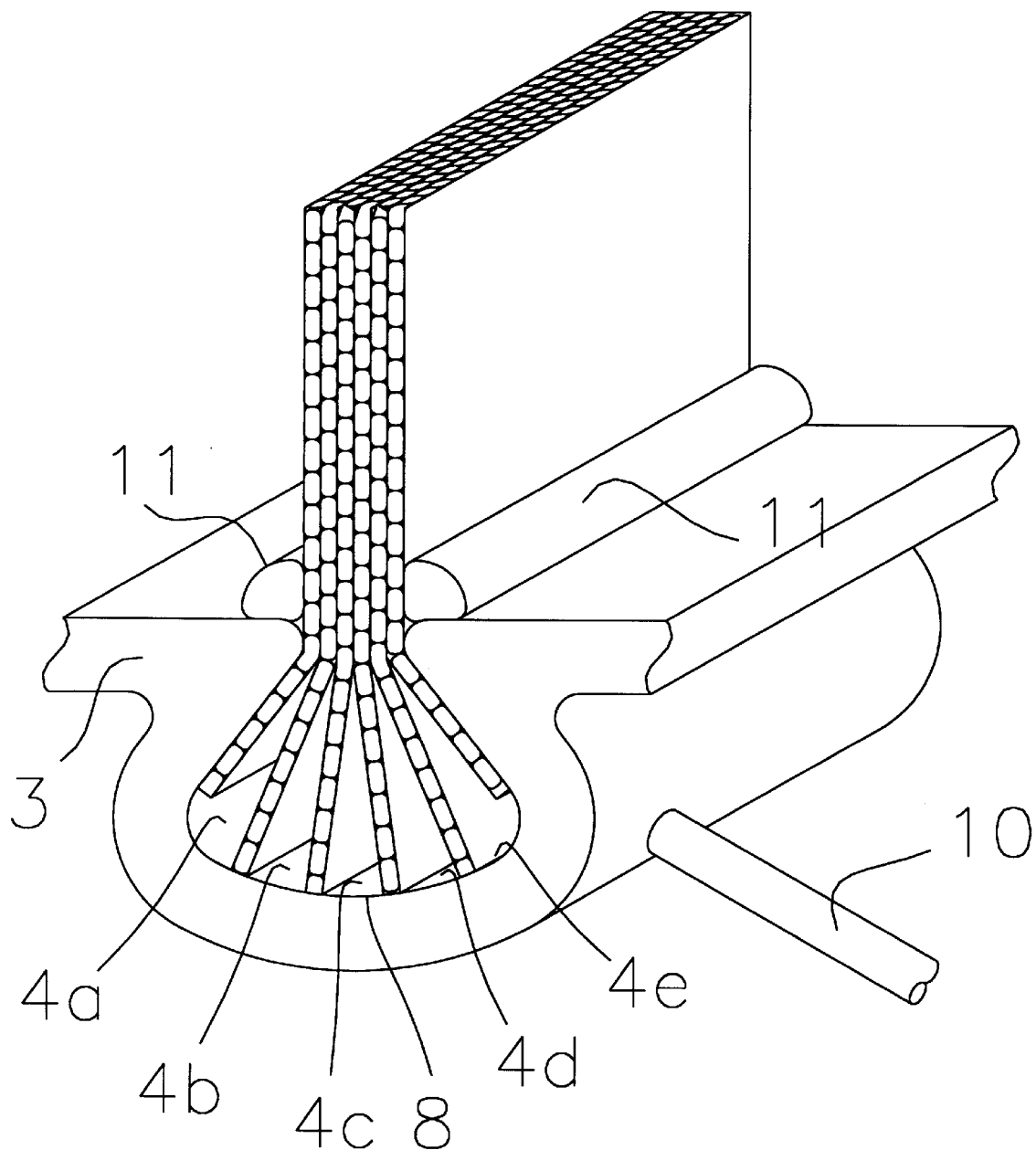

Referring to FIG. 6, the slotted element 3 may be equipped with resin injection means 10. Sealing means 11 may be used to seal off external air during evacuation of the cavity and to retain injected resin within the cavity.

What is claimed is:

1. A combination comprising:
   (a) a rigid member including a surface and a recess extending interiorly of said member from said surface; and further comprising an opening in said surface communicating with said recess; wherein said opening has a width less than the width of said recess;
   (b) a composite member comprising a plurality of layers and an edge portion; wherein said layers are bonded together along adjacent faces thereof except at said edge portion; wherein said edge portion extends into said recess in said rigid member through said opening; and
   (c) a hardenable material in said recess which is adhered to said edge portion of said composite member.

2. A method for securing a composite member to a rigid member comprising the steps of:
   (a) providing a composite member having a plurality of layers and an edge portion; wherein said layers are bonded together along adjacent faces thereof except at said edge portion;
   (b) providing a rigid member including a surface and a recess extending interiorly of said member from said surface; and further comprising an opening in said surface communicating with said recess; wherein said opening has a width less than the width of said recess;
   (c) inserting said edge portion into said recess through said opening;
   (d) placing a hardenable material into said recess in contact with said layers of said edge portion; and
   (e) hardening said hardenable material.

* * * * *